United States Patent [19]

Takata et al.

[11] Patent Number: 4,538,711
[45] Date of Patent: Sep. 3, 1985

[54] POWER TRANSMISSION DEVICE EASY TO MOUNT ON A DRIVER

[75] Inventors: Terasu Takata, Kiryu; Haruo Inoue, Tokyo, both of Japan

[73] Assignee: Ogura Clutch Co. Ltd., Gunma, Japan

[21] Appl. No.: 553,432

[22] Filed: Nov. 18, 1983

[30] Foreign Application Priority Data

Nov. 24, 1982 [JP] Japan ................. 57-177358

[51] Int. Cl.³ .............................. F16D 41/24
[52] U.S. Cl. .................. 192/18 R; 188/72.2; 188/72.7
[58] Field of Search .......... 188/71.1, 72.1, 72.2, 188/18 A, 72.7, 73.2, 218 XL, 382; 192/18 R, 12 R, 70 B, 48 B, 89 B; 74/572; 56/11.3, 11.8; D15/14

[56] References Cited

U.S. PATENT DOCUMENTS

| | | | |
|---|---|---|---|
| 4,271,658 | 6/1981 | Foster | 192/18 R X |
| 4,306,405 | 12/1981 | Fleigle | 192/18 R X |
| 4,377,224 | 3/1983 | Takata et al. | 192/18 R |
| 4,381,833 | 5/1983 | Foret | 188/73.2 X |
| 4,420,070 | 12/1983 | Maucher et al. | 192/89 B X |
| 4,427,101 | 1/1984 | Maucher et al. | 192/70.27 |

FOREIGN PATENT DOCUMENTS 1239257  7/1960  France ................. 192/18 R

*Primary Examiner*—George E. A. Halvosa
*Assistant Examiner*—Michael P. Gilday
*Attorney, Agent, or Firm*—Frishauf, Holtz, Goodman & Woodward

[57] ABSTRACT

In a power transmission device, guide elements, which are to be secured to a mounting portion of a driver, are axially fitted through and circumferentially arranged on a brake element concentrically disposed around a hollow tubular shaft which is adapted to be fitted on an output rotary shaft of the driver for rotation therewith. The brake element is urged by springs engaging the respective guide elements, toward an operating element which axially moves the brake element. An input element concentrically secured on the hollow tubular shaft and a friction plate concentrically and rotatably disposed thereabout have first and second openings, respectively, which are axially alignable with the guide elements, whereby the guide elements and the springs can be mounted into and removed from the power transmission device, through the aligned first and second openings.

8 Claims, 3 Drawing Figures

POWER TRANSMISSION DEVICE EASY TO MOUNT ON A DRIVER

BACKGROUND OF THE INVENTION

This invention relates to a power transmission device which is mounted between a driven machine such as a power lawn mower which serves, and a prime mover as the driver.

As a power transmission device for transmitting torque produced by a rotary machine as a driver to the rotary part of a driven machine to cause rotation of the latter, a clutch brake assembly has been proposed by U.S. Pat. No. 4,377,224 issued Mar. 22, 1983, which comprises: an annular operating element externally operative for rotational movement through a predetermined circumferential angle; a cylindrical input hub arranged concentrically of the operating element and rigidly fitted on an output shaft of a rotary machine as a driver; an output hub having an axially extending boss portion and arranged concentrically of the output shaft for rotation relative thereto; an annular friction plate spline-fitted on the boss portion of the output hub for rotational movement together with the output hub for axial displacement relative to the output hub for frictional engagement with the input hub; urging means resiliently urging the friction plate toward the input hub; an annular brake element interposed between the operating element and the friction plate for axial displacement into frictional engagement with the friction plate; guide means for the brake element, for permitting axial displacement of the brake element and prohibiting circumferential displacement of same; and a plurality of balls rollingly held between the operating element and the brake element. Axial displacement of the brake element in a direction toward the operating element causes frictional engagement of the input hub with the friction plate to thereby permit transmission of torque from the input hub to the output hub, and axial displacement of the brake element in a direction away from the operating element causes disengagement of the friction plate from the input hub to thereby interrupt frictional engagement of the brake element with the friction plate to thereby cause braking of the output hub.

In a conventional power lawn mower composed of a mower cutter, a prime mover and a power transmission device, the component parts of the power transmission device as constructed above are successively mounted onto an output shaft of the prime mover which may be an engine, to assemble the power transmission device and mount same onto the prime mover at the same time. Therefore, if the maker of the prime mover is not the same as the maker of the power transmission device, those who are not skilled in the manufacture of such power transmission devices will have to mount the power transmission device while simultaneously assembling same, for themselves.

This means that persons concerned with either the maker of the lawn mower who is usually supplied with prime movers completed as finished products and finally adjusted from the prime mover maker, or the prime mover maker who is also the maker of the lawn mower, will be compelled to perform the operation of mounting the component parts of the power transmission device onto the prime mover while simultaneously assembling same. This can result in poor fine adjustment of the assembled power transmission device, often leading to occurrence of a fault in the same device.

Therefore, it has been strongly desired by the lawn mower maker that the power transmission device maker should supply their product or power transmission device in an already assembled and adjusted state to the lawn mower maker, so that the latter has only to merely mount the power transmission device onto the prime mover.

Furthermore, a lawn mower should desirably be as compact in size and light in weight as possible. To this end, a power transmission device for use in such a lawn mower should have the smallest possible axial size and the smallest possible number of component parts.

SUMMARY OF THE INVENTION

It is an object of the invention to provide a power transmission device which can be assembled beforehand as a finished product and can be mounted onto a prime mover in a simple manner with ease, thereby facilitating positive manufacture of the final product at the facilities of a manufacturer of lawn mowers or the like, and also enabling the power transmission device maker to guarantee expected performance of its product.

It is a further object of the invention to provide a power transmission device which has a largely reduced axial size as a whole and a reduced number of component parts, thereby being compact in size as well as light in weight.

According to the invention, a power transmission device is provided which comprises: a hollow tubular shaft adapted to be fitted on an output rotary shaft of a driver for rotation therewith; an annular output element mounted on one end of the tubular shaft concentrically thereof for rotation relative thereto; an annular input element rigidly fitted on an intermediate portion of the tubular shaft concentrically thereof for rotational movement together with the tubular shaft; an annular operating element mounted on another end of the tubular shaft concentrically thereof for rotational movement relative to the tubular shaft through a predetermined circumferential angle; an annular friction plate interposed between the output element and the input element and mounted on the output element for rotational movement therewith and for displacement axially of the tubular shaft for frictional engagement with the input element; a first spring urging the friction plate toward the input element; an annular brake element arranged concentrically of the tubular shaft and interposed between the operating element and the friction plate for displacement axially of the tubular shaft for frictional engagement with the friction plate, the brake element having a plurality of through holes formed therein along the same circumference at circumferentially spaced locations; means responsive to rotation of the operating element for causing displacement of the brake element axially of the tubular element and relative to the operating element; a plurality of guide elements adapted to be secured to a mounting portion of the driver and axially fitted through respective ones of the above through holes of the brake element for permitting axial displacement of the brake element along themselves and prohibiting circumferential displacement of the brake element; and a plurality of second springs engaging respective ones of the guide elements and urging the brake element toward the operating element. The input element has at least one first opening formed at a location axially alignable with each of the guide elements, and the friction plate has at least one second opening formed at a location axially alignable with the above first opening, whereby the guide elements and the second springs can be mounted into and removed from the power transmission device through the first and second openings aligned with each other.

The brake element has a substantially cylindrical outer peripheral portion axially extending from a radial inner peripheral portion thereof and radially surrounding the input element. The friction plate has a first tapered portion obliquely and radially outwardly extending from a radial inner peripheral portion thereof toward the output element, a second tapered portion located radially outwardly of the first tapered portion and obliquely and radially outwardly extending toward the input element, and an annular flanged portion radially outwardly extending from the second tapered portion. Thus, the brake element and the friction plate also serve as a cover of the power transmission device, covering the input element, the output element, etc.

The input element is axially bent toward the friction plate at its radially intermediate portion and outer peripheral portion.

The above and other objects, features and advantages of the invention will be more apparent from the ensuing detailed description taken in conjunction with the accompanying drawings.

DETAILED DESCRIPTION

Figure 1:
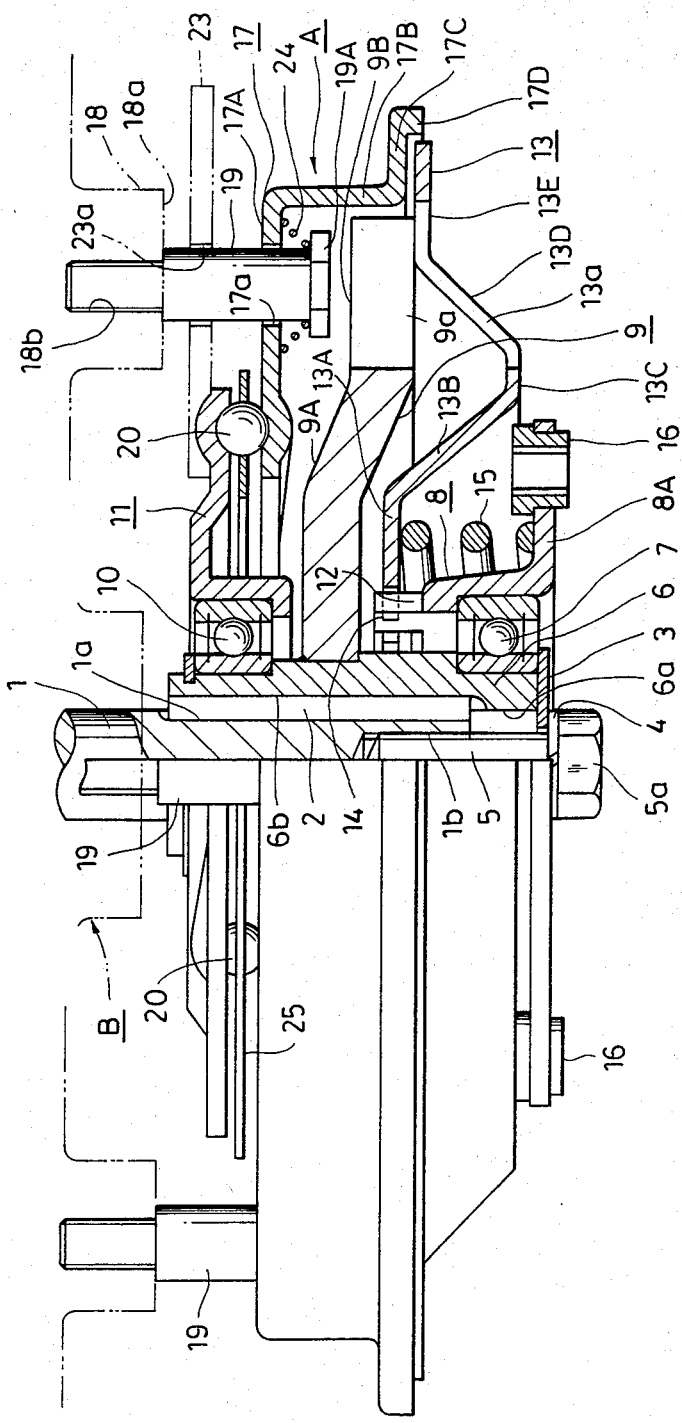
FIG. 1 is a side view of a power transmission device according to an embodiment of the invention in an engaged position, with the right half part thereof shown in longitudinal section.

Referring first to FIG. 1, there is illustrated a power transmission device according to an embodiment of the invention. The power transmission device A has a hollow tubular shaft 6 as an input hub arranged centrally of the device. The tubular shaft 6 axially extends substantially along the entire length of the device A and has an axially extending central through hole 6a in which is fitted an output rotary shaft 1 of a prime mover B as a driver which may be formed by an engine or an electric motor. A spline key 2 is fitted in a longitudinal groove 6b formed in the inner peripheral surface 6a of the central hole 6 and a longitudinal groove 1a formed in the outer peripheral surface of the output rotary shaft 1 to force the tubular shaft 6 to rotate about its own axis together with the rotating output rotary shaft 1. An annular retainer plate 3 is welded to an end face of the tubular shaft 6 remote from the prime mover B. A bolt 5 is fitted into the central hole 6a of the tubular shaft 6 through this retainer plate 3 and threadedly fitted into a tapped hole 1b formed in a free end face of the output rotary shaft 1, with a spring washer 4 resiliently held between the head 5a of the bolt 5 and the retainer plate 3 so as to prevent disengagement of the tubular shaft 6 from the rotary shaft 1.

An output hub 8 as an output element is rotatably mounted on an end of the tubular shaft 6 concentrically thereof via a radial ball bearing 7, and is formed integrally at its outer end with an annular radial flange 8A on which is to be mounted a mower cutter, not shown. An annular flywheel 9 forming part of the input hub is rigidly fitted on an intermediate portion of the tubular shaft 6 concentrically thereof for rotation together with the tubular shaft 6. An annular operating disc 11 as an operating element is concentrically mounted on the other end of the tubular shaft 6 via a radial ball bearing 10 and is rotatable about the tubular shaft 6 through a predetermined small circumferential angle by means hereinafter referred to. This operating disc 11 is provided with an operating lever 23 extending radially outwardly thereof and externally operatable manually.

A friction plate 13 is arranged concentrically of the tubular shaft 6 for displacement axially of the tubular shaft 6 for frictional engagement with the flywheel 9. That is, it has its inner peripheral surface formed integrally with teeth 14 meshing with a crown gear 12 formed integrally on an inner end of the output hub 8 so that the output hub 8 is rotated in unison with the friction plate 13 about the tubular shaft 6. The flywheel 9 is slightly axially bent toward the friction plate 13 at its radially intermediate portion 9A and outer peripheral portion 9B.

A compression coiled spring 15 has one end disposed in urging contact with an inner end face of the flange 8A of the output hub 8 serving as a spring seating surface. The flange 8A carries hollow mounting pieces 16 fitted through an outer peripheral portion of the flange 8A of the output hub 8 at circumferentially predetermined locations, preferably at two diametrically symmetrical locations, in which are to be fitted mounting screws, not shown, for the cutter of a lawn mower, not shown.

The friction plate 13 comprises a radially extending inner peripheral portion 13A serving as a spring seating portion urged by the other end of the compression coiled spring 15, a first tapered portion 13B obliquely and radially outwardly extending from the inner peripheral portion 13A toward the flange 8A of the output hub 8 and terminating in the vicinity of the outer periphery of the flange 8A, a radial intermediate portion 13C radially outwardly extending from the first tapered portion 13B, a second tapered portion 13D obliquely and radially outwardly extending from the intermediate portion 13C toward the flywheel 9, and a radial outer peripheral portion 13E in the form of an annular radial flange radially outwardly extending from the second tapered portion 13D. With this configuration, the friction plate 13 also serves as a cover covering a lower side surface of the flywheel 9 as well as an upper side of the flange 8A of the output hub 8 so as to prevent intrusion of alien substances into the interior of the device A. The above flanged outer peripheral portion 13E has its radially inner portion disposed for frictional contact with a radially outer portion of the flywheel 9. The outer diameter of the friction plate 13 is set at a value larger than that of the flywheel 9 so that the outer peripheral portion 13E can be brought into frictional contact with an outer peripheral portion of a brake element 17 hereinafter referred to.

The brake element 17 is arranged between the operating disc 11 and the flywheel 9. The brake element 17 comprises a radially extending inner peripheral portion 17A, a substantially cylindrical outer peripheral portion 17B axially extending from the inner peripheral portion 17A toward the friction plate 13 in a manner radially surrounding the flywheel 9, an annular flanged portion 17C radially outwardly extending from the outer peripheral portion 17B and axially facing the radial outer peripheral portion 13E of the friction plate 13, and an outer peripheral edge portion 17D axially extending from the flanged portion 17C toward the friction plate 13. The brake element 17 is formed with a plurality of through holes 17a along the same circumference at circumferentially spaced locations, through which are fitted as many bolts 19 as guide elements for mounting and guiding the brake element 17. The bolts 19 have their threaded end portions threadedly fitted in respective tapped holes 18b in a mounting surface 18a of a mounting frame 18 of the prime mover B and support the brake element 17 in a manner allowing same to move along the bolts 19 only in the axial directions or parallel with the tubular shaft 6. That is, the bolts 19 act as means for preventing rotational movement of the brake element 17. A spring 24 is fitted on each of the bolts 19 and interposed tautly between the enlarged head 19A of the bolt 19 and the brake element 17, urging the brake element 17 toward the operating disc 11. In the illustrated embodiment, the spring 24 is formed by a coiled spring in the form of a frustum of cone, with its one end with a smaller diameter disposed in urging contact with the enlarged head 19A of the associated bolt 19, and its other end with a larger diameter in contact with a marginal edge of the associated through hole 17a in the brake element 17, respectively, and accordingly the spring 24 is positively mounted in a mounting space with a limited axial size. But, an ordinary cylindrical coiled spring may be used as the spring 24, if the mounting space is large enough to accommodate such a spring.

Figure 2:
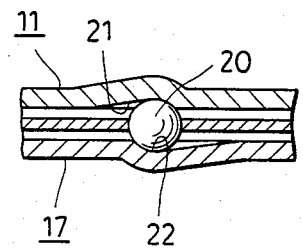
FIG. 2 is a sectional view showing the relative positions of the operating disc and the brake element in FIG. 1.

A plurality of clutch balls 20 are held between the radial inner peripheral portion 17A of the brake element 17 and the operating disc 11 at circumferentially spaced locations. Each of the balls 20 is rollingly fitted in a pair of a plurality of grooves 21, 22 formed in respective opposed side surfaces of the operating disc 11 and the brake element 17 at circumferentially spaced locations. Each of the grooves 21, 22 has an elongate configuration and extends circumferentially, each having a slanted bottom with a depth gradually decreasing from one end toward the other end. As shown in FIG. 2, the bottom of the grooves 21, 22 are slanted in opposite directions to each other. Thus, for instance, when the operating lever 23 for the operating disc 11 is circumferentially rotated to locate the balls 20 at the shallower portions of the grooves 21, 22, the brake element 17 is axially displaced away from the operating disc 11 against the urging force of the springs 24.

The operating lever 23 for the operating disc 11 is formed with an arcuate elongate through hole 23a through which one of the bolts 19 is fitted to limit the maximum rotatable angle of the operating disc 11. Alternatively of the illustrated arrangement, the operating lever 23 may be arranged between two adjacent ones of the bolts 19 so that the two bolts act as stoppers for the operating lever 23 to limit the maximum rotatable angle of the operating disc 11.

The friction plate 13 is formed with a through hole 13a at part of the radial intermediate portion 13C, the second tapered portion 13D and part of the radial outer peripheral portion 13E at a location radially corresponding to or axially alignable with the locations of the bolts 19. Also, the flywheel 9 has a notch 9a formed in its outer peripheral surface at a location radially corresponding to or axially alignable with the above through hole 13a. As stated hereinafter, after these openings 9a, 13a have been aligned with each other, the bolts 19 are mounted into the device A or removed therefrom through the aligned openings. Alternatively of the illustrated arrangement, the openings 9a, 13a may both be through holes or may be both notches formed by cutting off part of the outer peripheral edges of the members 9, 13. Although only one each of such openings can suffice, the openings 9a and 13a may each be as many as the bolts 19 and arranged at locations circumferentially corresponding to respective ones of the bolts 19 so that the openings 9a, 13a can all be positioned in alignment with their respective bolts 19 at the same time.

Further, the annular flanged portion 17C of the brake element 17 is located opposite a radially outer portion of the radial outer peripheral portion 13E of the friction plate 13 so that when the brake element 17 is axially displaced away from the operating disc 11, it urgingly displaces the friction plate 13 to detach the friction plate 13 from the flywheel 9 with which it has been in frictional engagement. Further, the peripheral edge portion 17D of the brake element 17 is disposed over the outer periphery of the friction plate 13 in a surrounding manner so as to prevent intrusion of alien matter into the device A through the gap between the two elements 13, 17, as well as to prevent touching of the operator's hand with the rotating friction plate 13.

Figure 3:
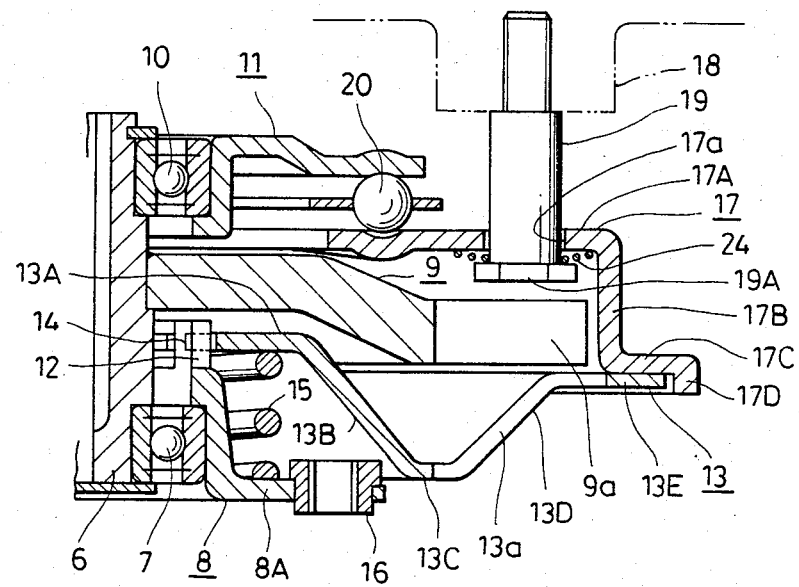
FIG. 3 is a side view of the right half part of the power transmission device of FIG. 1 in a disengaged position.

The device A constructed as above operates as follows. The device can perform two functions as a clutch, clutch engagement, and clutch disengagement and simultaneous braking of the output hub 8, by rotating the operating disc 11 about the tubular shaft 6 through the operating lever 23 to one of its extreme positions or the other of same. More specifically, when the operating disc 11 is rotated to one of the extreme positions where the clutch balls 20 are located at the shallower portions of the respective grooves 21, 22, the distance between the opposed side surfaces of the operating disc 11 and the brake element 17 has a maximum value as shown in FIG. 3, and thus the brake element 17 is axially displaced in a direction away from the operating disc 11 to have its radial flanged portion 17C urgingly displace the outer peripheral portion 13E of the friction plate 13 to detach the friction plate 13 from the flywheel 9 as the input element. In this position, transmission of torque through the friction plate 13 to the output hub 8 from the flywheel 9 rotating together with the tubular shaft 6 rotatively coupled to the output rotary shaft 1 of the prime mover B is interrupted. Simultaneously, the friction plate 13, which is permanently urged by the coiled spring 15, is brought into frictional contact with the brake element 17, which is kept from rotating by means of the bolts 19, to prevent rotation of the rotary part of the driven machine due to its inertia force, thus performing braking.

On the contrary, when the operating disc 11 is rotated to the other extreme position as shown in FIG. 1 where the clutch balls 20 are located at the deepest portions of the respective grooves 21, 22, the brake element 17 is displaced toward the operating disc 11 by the urging force of the coiled springs 24 to have its radial flanged portion 17C detached from the outer peripheral portion 13E of the friction plate 13. At the same time the friction plate 13 is displaced toward the flywheel 9 by the urging force of the coiled spring 15 to have its outer peripheral portion 13E brought into frictional contact with the flywheel 9, to thereby permit transmission of torque from the tubular shaft 6 or the output rotary shaft 1 to the output hub 8 through the flywheel 9 and the friction plate 13.

The power transmission device according to the invention constructed as above is assembled by mounting the hub 8, friction plate 13, flywheel 9, brake element 17, operating disc 11, etc. onto the tubular shaft 6 in a predetermined order, and the device thus assembled is adjusted and can be delivered from the power transmission device manufacturer as a finished product. That is, the product is delivered from the plant with the bolts 19, springs 24, etc. separate from the assembled unit. The manufacturer of a lawn mower or the like supplied with the device A attaches the same device A to a prime mover and a driven machine to obtain a final product such as a power lawn mower, and delivers the final product.

To mount the present device A onto the prime mover B, first the tubular shaft 6 has its central hole 6a fitted over the output rotary shaft 1 of the prime mover B while simultaneously the spline key 2 fitted beforehand in the longitudinal groove 1a in the output rotary shaft 1 is gradually fitted into the longitudinal groove 6b of the tubular shaft 6, and then the bolt 5 with the spring washer 4 fitted thereon beforehand is screwed into the tapped hole 1b of the output rotary shaft 1. Then, the opening 13a of the friction plate 13 and the opening 9a of the flywheel 9 are brought into axial alignment with each other, and the aligned openings 13a, 9a are brought into a position circumferentially corresponding to the mounting position of each of the bolts 19. Each of the bolts 19 with the spring 24 fitted thereon beforehand is passed through the aligned openings 13a, 9a from outside and through a corresponding one of the through holes 17a of the brake element 17, and screwed into a corresponding one of the tapped holes 18b in the mounting frame 18 of the prime mover B. One of the bolts 19 is passed through the elongate hole 23a of the operating lever 23, too.

If there is a fear of the clutch balls 20 slipping off the grooves 21, 22, a suitable retainer plate 25 or a like member may be used through which the balls 20 are supportedly fitted.

After the present device A has thus been mounted on the prime mover B, a driven machine, not shown, such as a lawn mowing cutter unit, is mounted onto the output hub 8.

Although in the aforestated embodiment single-piece bolts 19 are employed as means for guiding the brake element 17, the means is not limited to such bolts, but may be formed by ordinary type bolts and separate sleeves fitted thereon.

As will be learned from the above description, the power transmission device according to the invention can be supplied as a finished product integrally assembled, to a final product maker such as a lawn mower maker, and the final product maker can mount the device onto a prime mover in a simple manner with ease, thereby making it possible to positively manufacture the final product with a high yield. Furthermore, since the power transmission device per se is manufactured by the power transmission device maker, expected performance of the device can be guaranteed.

Still further, since the friction plate 13 covers the output hub 8 and the flywheel 9, while the brake element 17 covers the flywheel 9, etc., omitting the use of a separate covering member as conventionally used, the number of component parts is reduced, thereby reducing the whole weight of the device. Besides, in addition to the arrangement that only one side surface of the friction plate 13 takes part in performing two actions, i.e., clutch action and brake action, the flywheel 9 is aixally bent toward the friction plate 13, thereby greatly reducing the whole axial size of the device.

While a preferred embodiment of the invention has been described, variations thereto will occur to those skilled in the art within the scope of the present inventive concepts which are delineated by the following claims.

What is claimed is:

1. A power transmission device for installation between a driver including an output rotary shaft and a mounting portion, and a driven machine, comprising:
   a hollow tubular shaft adapted to be fitted on said output rotary shaft of said driver for rotation therewith;
   an annular output element mounted concentrically on one end of said tubular shaft for rotation relative thereto;
   an annular input element rigidly fitted concentrically on an intermediate portion of said tubular shaft for rotational movement together with said tubular shaft;
   an annular operating element mounted concentrically on another end of said tubular shaft for rotational movement relative to said tubular shaft through a predetermined circumferential angle;
   an annular friction plate interposed between said output element and said input element and mounted on said output element for rotational movement therewith and for displacement axially of said tubular shaft for frictional engagement with said input element;
   a first spring for urging said friction plate toward said input element;
   an annular brake element arranged concentrically of said tubular shaft and interposed between said operating element and friction plate for displacement axially of said tubular shaft for frictional engagement with said friction plate, said brake element having a plurality of through holes formed therein along a given circumference at circumferentially spaced locations;
   means responsive to rotation of said operating element for causing displacement of said brake element axially of said tubular shaft and relative to said operating element;
   a plurality of guide elements adapted to be secured to said mounting portion of said driver and axially fitted through respective ones of said through holes of said brake element for permitting axial displacement of said brake element along said guide elements and prohibiting circumferential displacement of said brake elements; and
   a plurality of second springs engaging respective ones of said guide elements and urging said brake element toward said operating element,
   said input element having at least one first opening formed at a location axially alignable with each of said guide elements, said friction plate having at least one second opening at a location axially alignable with said first opening of said input element so that said guide elements and said second springs can be mounted into and removed from said power transmission device through said first and said second openings when aligned with each other; and wherein said friction plate comprises a radially extending inner peripheral portion which is urged by said first spring, a first tapered portion obliquely and radially outwardly extending from said inner peripheral portion toward said output element, a second tapered portion located radially outwardly of said first tapered portion and obliquely and radially outwardly extending toward said input element, and an annular peripheral portion radially outwardly extending from said second tapered portion, so that said friction plate covers said input element and said output element.

2. A power transmission device as claimed in claim 1, wherein said friction plate is larger in outer diameter than said input element, said input element having an outer peripheral surface, said first opening comprising a notch formed in said outer peripheral surface of said input element, said second opening comprising a through hole formed in said friction plate.

3. A power transmission device as claimed in claim 1, wherein said friction plate has an outer peripheral portion disposed for frictional engagement with said input element, said brake element having a radially extending inner peripheral portion, a substantially cylindrical outer peripheral portion axially extending from said inner peripheral portion toward said friction plate and radially surrounding said input element, and an annular flanged portion radially outwardly extending from said outer peripheral portion of said brake element for frictional engagement with said outer peripheral portion of said friction plate.

4. A power transmission device as claimed in claim 3, wherein said brake element has an outer peripheral edge portion axially extending from said annular flanged portion toward said friction plate and radially surrounding said friction plate.

5. A power transmission device as claimed in claim 1, wherein said input element has a radially intermediate portion and an outer peripheral portion, said input element being axially bent toward said friction plate at said radially intermediate potion and said outer peripheral portion thereof.

6. A power transmission device as claimed in claim 1, wherein said guide elements each comprise a bolt having an enlarged head formed at one end thereof, and a threaded portion formed at another end portion thereof and threadedly fitted in said mounting portion of said driver.

7. A power transmission device as claimed in claim 5, wherein said second spring comprises a coiled spring in the form of a frustum of cone, said second spring having one end having a smaller diameter and disposed in urging contact with said enlarged head of said guide element, and another end having a larger diameter and disposed in urging contact with said brake element.

8. A power transmission device as claimed in claim 1, wherein said output rotary shaft of said driver has an outer peripheral surface formed with a first longitudinal groove, and one end face formed with a tapped hole, said tubular shaft having one end face, and an inner peripheral surface formed with a second longitudinal groove, said device including a spline key for fitting in said first and second longitudinal grooves, a bolt having an enlarged head, for threaded engagement in said tapped hole of said output rotary shaft, and an annular retainer plate secured to said one end face of said tubular shaft, said enlarged head of said bolt being in urging contact with said retainer plate when said bolt is threadedly fitted in said tapped hole.

* * * * *

UNITED STATES PATENT AND TRADEMARK OFFICE
CERTIFICATE OF CORRECTION

PATENT NO.  : 4,538,711

DATED       : September 3, 1985

INVENTOR(S) : Terasu TAKATA et al.

It is certified that error appears in the above-identified patent and that said Letters Patent is hereby corrected as shown below:

Column 10, line 7 "potion" should read --portion--;
          line 15, (claim 7, line 1), "claim 5" should read --claim 6--.

Signed and Sealed this

Twenty-eighth Day of January 1986

[SEAL]

Attest:

DONALD J. QUIGG

Attesting Officer   Commissioner of Patents and Trademarks